US012610410B2

(12) United States Patent
Zheng et al.

(10) Patent No.: US 12,610,410 B2
(45) Date of Patent: Apr. 21, 2026

(54) INFORMATION SENDING METHOD, INFORMATION RECEIVING METHOD, APPARATUS, AND TERMINAL

(71) Applicant: VIVO MOBILE COMMUNICATION CO., LTD., Dongguan (CN)

(72) Inventors: Qian Zheng, Dongguan (CN); Xiaodong Yang, Dongguan (CN); Wen Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 379 days.

(21) Appl. No.: 18/124,256

(22) Filed: Mar. 21, 2023

(65) Prior Publication Data

US 2023/0232474 A1 Jul. 20, 2023

Related U.S. Application Data

(63) Continuation of application No. PCT/CN2021/118524, filed on Sep. 15, 2021.

(30) Foreign Application Priority Data

Sep. 21, 2020 (CN) ......................... 202010997506.X

(51) Int. Cl.
| | |
|---|---|
| *H04W 76/04* | (2009.01) |
| *H04W 8/00* | (2009.01) |
| *H04W 76/14* | (2018.01) |
| *H04W 84/12* | (2009.01) |

(52) U.S. Cl.
CPC .......... *H04W 76/14* (2018.02); *H04W 8/005* (2013.01); *H04W 84/12* (2013.01)

(58) Field of Classification Search
CPC ..... H04W 76/14; H04W 8/005; H04W 84/12; H04W 76/18; H04W 76/16; H04W 8/24
See application file for complete search history.

(56) References Cited

U.S. PATENT DOCUMENTS

| | | | |
|---|---|---|---|
| 10,028,294 B2 | 7/2018 | Yi et al. | |
| 10,070,474 B2 | 9/2018 | Wietfeldt et al. | |
| 11,109,429 B2 | 8/2021 | Liu et al. | |
| 11,438,892 B2 | 9/2022 | Hou et al. | |
| 2018/0084497 A1* | 3/2018 | Jung ...................... | H04W 76/14 |
| 2018/0206116 A1* | 7/2018 | Ismail ................... | H04L 47/808 |
| 2020/0252989 A1* | 8/2020 | Chen ...................... | H04W 76/19 |
| 2021/0037420 A1* | 2/2021 | Gulati ................... | H04W 24/08 |
| 2021/0168589 A1 | 6/2021 | Yasukawa et al. | |
| 2021/0204350 A1 | 7/2021 | Lu et al. | |
| 2022/0077990 A1* | 3/2022 | Bao ...................... | H04L 5/0051 |

(Continued)

FOREIGN PATENT DOCUMENTS

| | | |
|---|---|---|
| CA | 3116599 A1 | 5/2020 |
| CN | 105934896 A | 9/2016 |

(Continued)

*Primary Examiner* — Schquita D Goodwin
(74) *Attorney, Agent, or Firm* — The Webb Law Firm

(57) ABSTRACT

An information sending method includes sending first information to a second terminal, where the first information is used to indicate support information and/or preferential information of a first terminal for communication, the communication includes at least one of first communication or second communication, and the first communication or the second communication is sidelink communication.

20 Claims, 6 Drawing Sheets

12

Network side device

11 Terminal

11 Terminal

(56)          References Cited

U.S. PATENT DOCUMENTS

| 2022/0132603 | A1 * | 4/2022 | Adjakple | ................ | H04W 4/40 |
|---|---|---|---|---|---|
| 2022/0141827 | A1 | 5/2022 | Zhao | | |
| 2022/0191962 | A1 * | 6/2022 | Di Girolamo | ........ | H04L 5/0053 |
| 2023/0246701 | A1 * | 8/2023 | Cheng | ............... | H04W 72/0453 |
| | | | | | 370/315 |

FOREIGN PATENT DOCUMENTS

| CN | 108541384 A | 9/2018 | | |
|---|---|---|---|---|
| CN | 109379171 A | 2/2019 | | |
| CN | 110463230 A | 11/2019 | | |
| CN | 110891320 A | 3/2020 | | |
| CN | 110999449 A | 4/2020 | | |
| CN | 111052855 A | 4/2020 | | |
| CN | 111328069 A | 6/2020 | | |
| CN | 111436139 A | 7/2020 | | |
| CN | 111586624 A | 8/2020 | | |
| CN | 111867147 A | 10/2020 | | |
| WO | WO-2018028694 A1 * | 2/2018 | ............ | H04W 40/20 |
| WO | 2019023857 A1 | 2/2019 | | |
| WO | 2020062042 A1 | 4/2020 | | |

* cited by examiner

Network side device

11

11

Terminal

Terminal

Start

Send first information to a second terminal                    201

End

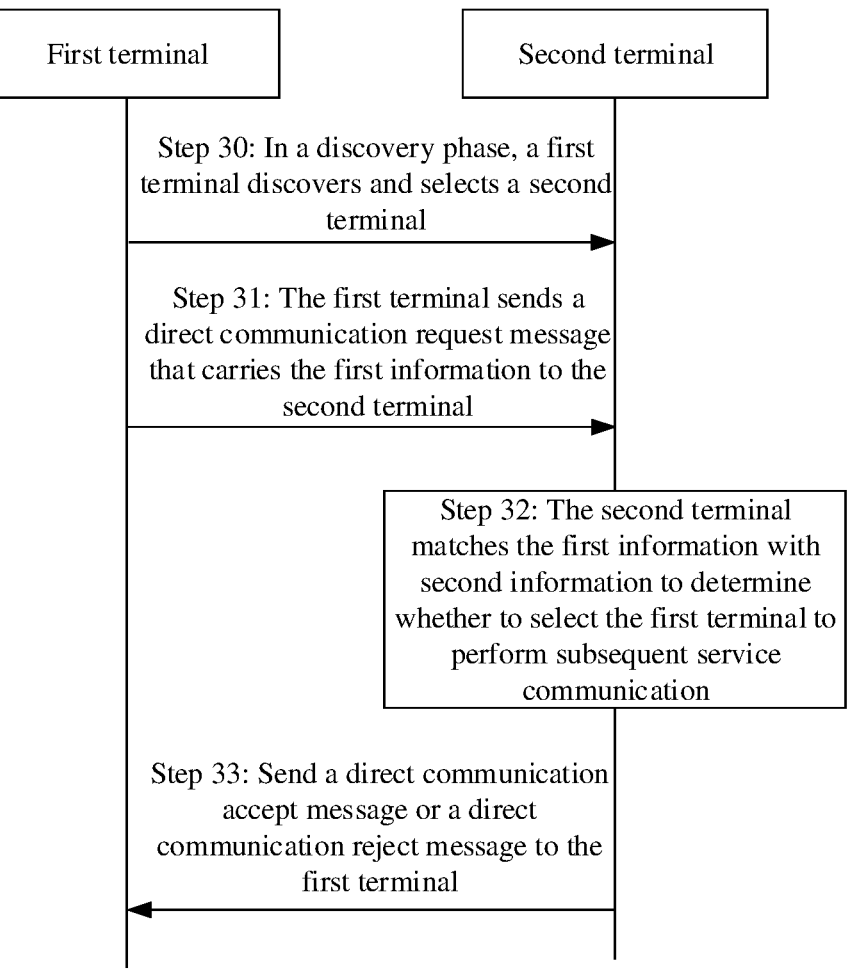

Step 30: In a discovery phase, a first terminal discovers and selects a second terminal Step 31: The first terminal sends a direct communication request message that carries the first information to the second terminal Step 32: The second terminal matches the first information with second information to determine whether to select the first terminal to perform subsequent service communication Step 33: Send a direct communication accept message or a direct communication reject message to the first terminal

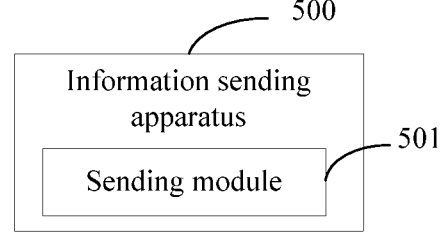

Information sending apparatus

Sending module

Information receiving
apparatus

601

Receiving module

602

Determining module

70

Terminal        71

Processor

72

Memory

INFORMATION SENDING METHOD, INFORMATION RECEIVING METHOD, APPARATUS, AND TERMINAL

CROSS-REFERENCE TO RELATED APPLICATIONS

This application is a Bypass Continuation application of PCT/CN2021/118524 filed Sep. 15, 2021, and claims priority to Chinese Patent Application No. 202010997506.X filed on Sep. 21, 2020, the disclosures of which are hereby incorporated by reference in their entireties.

BACKGROUND OF THE INVENTION

Field of the Invention

This application pertains to the field of communication technologies, and specifically relates to an information sending method, an information receiving method, an apparatus, and a terminal.

Description of Related Art

A sidelink (SL) is also referred to as a side link, and the sidelink may be used to directly transmit data between terminals without using a network device. However, currently, communication capabilities that may be supported by different terminals are different. In this way, service transmission between terminals may be affected because supported communication mismatches, and service transmission performance between terminals is relatively poor.

SUMMARY OF THE INVENTION

The embodiments of this application provide an information sending method, an information receiving method, an apparatus, and a terminal.

According to a first aspect, an information sending method is provided, is applied to a first terminal, and includes:

sending first information to a second terminal; where the first information is used to indicate support information and/or preferential information of the first terminal for communication, the communication includes at least one of first communication or second communication, and the first communication or the second communication is sidelink (SL) communication.

According to a second aspect, an information receiving method is provided, is applied to a second terminal, and includes:

receiving first information sent by a first terminal, where the first information is used to indicate support information and/or preferential information of the first terminal for communication, the communication includes at least one of first communication or second communication, and the first communication or the second communication is sidelink (SL) communication; and determining, according to the first information, whether to select the first terminal to perform communication.

According to a third aspect, an information sending apparatus is provided, is applied to a first terminal, and includes:

a sending module, configured to send first information to a second terminal; where the first information is used to indicate support information and/or preferential information of the first terminal for communication, the communication includes at least one of first communication or second communication, and the first communication or the second communication is sidelink (SL) communication.

According to a fourth aspect, an information receiving apparatus is provided, is applied to a second terminal, and includes:

a receiving module, configured to receive first information sent by a first terminal, where the first information is used to indicate support information and/or preferential information of the first terminal for communication, the communication includes at least one of first communication or second communication, and the first communication or the second communication is sidelink (SL) communication; and a determining module, configured to determine, according to the first information, whether to select the first terminal to perform communication.

According to a fifth aspect, a terminal is provided, the terminal includes a processor, a memory, and a program or an instruction that is stored in the memory and executable on the processor, and when the program or the instruction is executed by the processor, steps in the information sending method described in the first aspect are implemented, or when the program or the instruction is executed by the processor, steps in the information receiving method described in the second aspect are implemented.

According to a sixth aspect, a non-transitory readable storage medium is provided. The non-transitory readable storage medium stores a program or an instruction, and when the program or the instruction is executed by a processor, steps in the information sending method described in the first aspect are implemented, or steps in the information receiving method described in the second aspect are implemented.

According to a seventh aspect, a chip is provided. The chip includes a processor and a communication interface, the communication interface is coupled to the processor, and the processor is configured to run a program or an instruction of a network side device, to implement the information sending method described in the first aspect or the information receiving method described in the second aspect.

According to an eighth aspect, an embodiment of this application provides a computer software product, where the computer software product is stored in a non-volatile storage medium, and the software product is configured to be executed by at least one processor to implement steps in the method described in the first aspect or steps in the method described in the second aspect.

According to a ninth aspect, a terminal is provided, where the terminal is configured to perform the method described in the first aspect, or perform the method described in the second aspect.

BRIEF DESCRIPTION OF DRAWINGS

FIG. 4A to FIG. 4C are a flowchart of information exchange performed by a terminal according to an embodiment of this application;

FIG. 5 is a structural diagram of an information sending apparatus according to an embodiment of this application;

DESCRIPTION OF THE INVENTION

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art fall within the protection scope of this application.

Terms "first" and "second" in the specification and claims of this application are used to distinguish between similar objects, and do not need to be used to describe a specific order or sequence. It should be understood that data used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, in the specification and the claims, "and/or" represents at least one of connected objects, and the character "I" generally represents an "or" relationship between associated objects.

It should be noted that the technology described in this application is not limited to a Long Term Evolution (LTE)/LTE-advanced (LTE-A) system, and may also be used in various wireless communication systems, for example, Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application are often used interchangeably. The described technology may be used in the foregoing system and radio technology, and may also be used in another system and radio technology. However, a New Radio (NR) system is described below as an example, and the term NR is used in most of the descriptions, although these technologies can also be used in an application other than an application of the NR system, for example, a sixth (6-th Generation, 6G) communication system.

Figure 1:
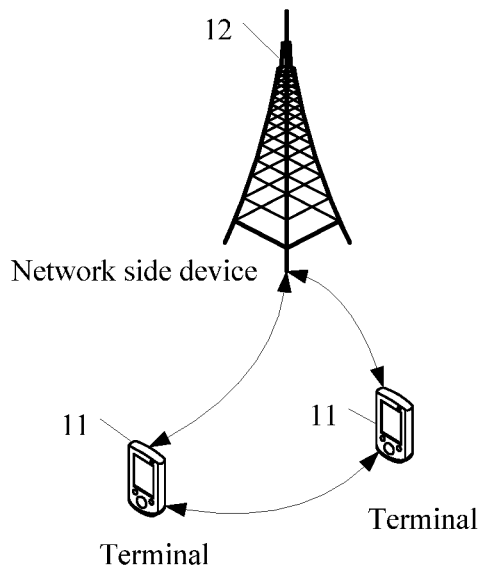
FIG. 1 is a structural diagram of a network system according to an embodiment of this application.

FIG. 1 is a block diagram of a wireless communication system to which an embodiment of this application is applicable. The wireless communication system includes a terminal 11 and a network side device 12. The terminal 11 may also be referred to as a terminal device or user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device or a vehicle-mounted device (VUE), or a pedestrian terminal (PUE). The wearable device includes a band, a headset, eyeglasses, or the like. It should be noted that a specific type of the terminal 11 is not limited in this embodiment of this application. The network side device 12 may be a base station or a core network. The base station may be referred to as a NodeB, an evolved Node B, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, a transmitting receiving point (TRP), or another suitable term in the field provided that a same technical effect is achieved. The base station is not limited to a specific technical term. It should be noted that, in this application, only a base station in an NR system is used as an example, but a specific type of the base station is not limited.

An information sending method and an information receiving method provided in the embodiments of this application are described in detail below with reference to the accompanying drawings by using some embodiments and application scenarios thereof.

Figure 2:
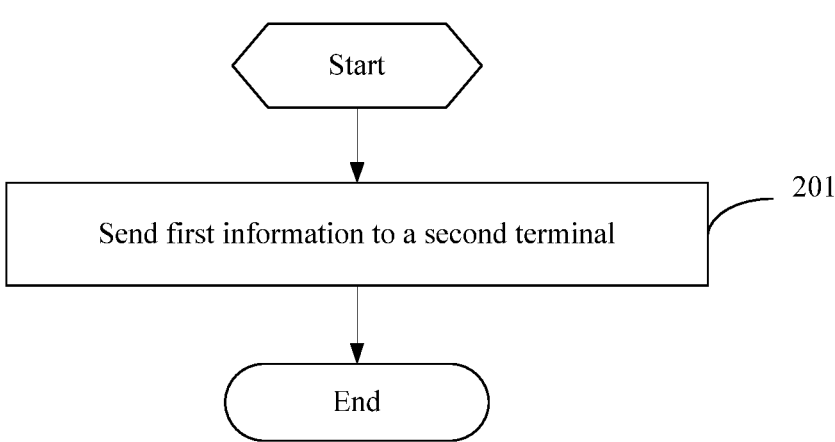
FIG. 2 is a flowchart of an information sending method according to an embodiment of this application.

FIG. 2 is a flowchart of an information sending method according to an embodiment of this application. The information sending method is applied to a first terminal and includes:

Step 201: Send first information to a second terminal, where the first information is used to indicate support information and/or preferential information of a first terminal for communication, the communication includes at least one of first communication or second communication, and the first communication or the second communication is sidelink SL communication.

After a discovery phase or a discovery phase (for example, a direct communication establishment phase), the first terminal sends the first information to the second terminal, and the second terminal determines, according to the first information and support information and/or preferential information of the second terminal for communication, whether to select the first terminal to perform communication.

For example, if the first information indicates that aggregated (aggregation) communication of sidelink (SL) and a wireless local area network (WLAN) is supported, where the aggregated communication of SL and WLAN may also be referred to as inter-working SL and WLAN communication, and the second information indicates that only SL communication is supported, the second terminal cannot select the first terminal for subsequent service communication. If the first information indicates that aggregated communication of SL and WLAN is supported, and the second information indicates that aggregated communication of SL and WLAN is supported, the second terminal may select the first terminal to perform subsequent service communication.

The second terminal may learn, based on the first information sent by the first terminal, the support information and/or the preferential information of the first terminal for the communication, and the second terminal may determine, based on the first information and the support information and/or the preferential information of the second terminal for the communication, whether to select the first terminal to perform subsequent service communication.

In this embodiment, the first information is sent to the second terminal, where the first information is used to indicate support information and/or preferential information of the first terminal for communication, the communication includes at least one of first communication or second communication, and the first communication or the second communication is sidelink SL communication. In this way, the second terminal can learn whether communication supported or inclined by the second terminal matches the first terminal, so that the second terminal determines whether to select the first terminal to perform subsequent service communication, thereby improving service transmission performance between terminals.

In an embodiment of this application, the first communication is SL communication, and the second communication is WLAN communication or Bluetooth communication.

In the foregoing descriptions, in a case that the first communication is SL communication and the second communication is WLAN communication, support information indicated by the first information is used to indicate one of the following:

that only the SL communication is supported;

that only the WLAN communication is supported; and that aggregated communication of SL and WLAN is supported; and/or the preferential information is used to indicate one of the following:

that the SL communication is preferential;

that the WLAN communication is preferential; and that aggregated communication of SL and WLAN is preferential.

Optionally, the preferential information may be changed based on an actual situation. For example, if an initiated service has a relatively high requirement for reliability and continuity, and/or WLAN link quality is poor, the preferential information may indicate that the aggregated communication of SL and WLAN or the SL communication is preferential. If a quality of service (QoS) requirement of the initiated service is low, and/or WLAN link quality is good, the preferential information may indicate that the WLAN communication is preferential, or the aggregated communication of SL and WLAN is preferential.

In other words, the preferential information is determined based on a service policy, and/or the preferential information is determined based on link quality. In other words, the preferential information may be determined based on a service policy (static information), may be determined based on an actual link condition (dynamic information), or may be determined based on both a service policy and an actual link condition.

Optionally, the first information is further used to indicate at least one of service information of the WLAN communication or address information of the WLAN communication;

or the first information is further used to indicate at least one of service information of the WLAN communication or address information of the WLAN communication;

or the first information is further used to indicate at least one of service information of aggregated communication of SL and WLAN or address information of the aggregated communication of SL and WLAN.

In the foregoing descriptions, service information of the aggregated communication of SL and WLAN may be understood as: being used to carry an SL service or a WLAN service. Correspondingly, address information of the aggregated communication of SL and WLAN may be address information of the SL communication, or may be address information of the WLAN communication.

Optionally, the service information of the SL communication may include a service type (such as public safety or commercial), a service identifier (service ID), service QoS, and service code.

Optionally, the service information of the WLAN communication may include a service type (such as public safety or commercial), a service identifier (service ID), service QoS, and service code.

In the foregoing descriptions, the address information of the WLAN communication includes at least one of WLAN port configuration, WLAN identifier information, a WLAN version, or a WLAN protocol. The WLAN identifier information includes:

a basic service set identifier (BSSID), that is, a wireless fidelity (wifi) local area network address (Media Access Control Address, MAC Address);

a homogenous extended service set identifier (HESSID) defined in IEEE802 (HESSID defined in IEEE802);

a service set identifier (SSID) defined in IEEE802 (SSID defined in IEEE 802); and a WLAN version/protocol such as wifi 1-6, 802.11 a/b/g/n/ac/ax, and an Ethernet type (EtherType) 0x9E65.

In the foregoing descriptions, in a case that the first communication is SL communication and the second communication is Bluetooth communication, support information indicated by the first information is used to indicate one of the following:

that only the SL communication is supported;

that only Bluetooth communication is supported;

that aggregated communication of SL and Bluetooth is supported; and/or the preferential information is used to indicate one of the following:

that the SL communication is preferential;

that Bluetooth communication is preferential;

that aggregated communication of SL and Bluetooth is preferential.

Optionally, the first information is further used to indicate at least one of service information of the SL communication or address information of the Bluetooth communication;

or the first information is further used to indicate at least one of service information of the Bluetooth communication or address information of the Bluetooth communication;

or the first information is further used to indicate at least one of service information of aggregated communication of SL and Bluetooth or address information of the aggregated communication of SL and Bluetooth.

In the foregoing descriptions, service information of the aggregated communication of SL and Bluetooth may be understood as: being used to carry an SL service or a Bluetooth service. Correspondingly, address information of the aggregated communication of SL and Bluetooth may be address information of the SL communication, or may be address information of the Bluetooth communication. Address information of the Bluetooth communication includes a Bluetooth public address.

Figure 4A:
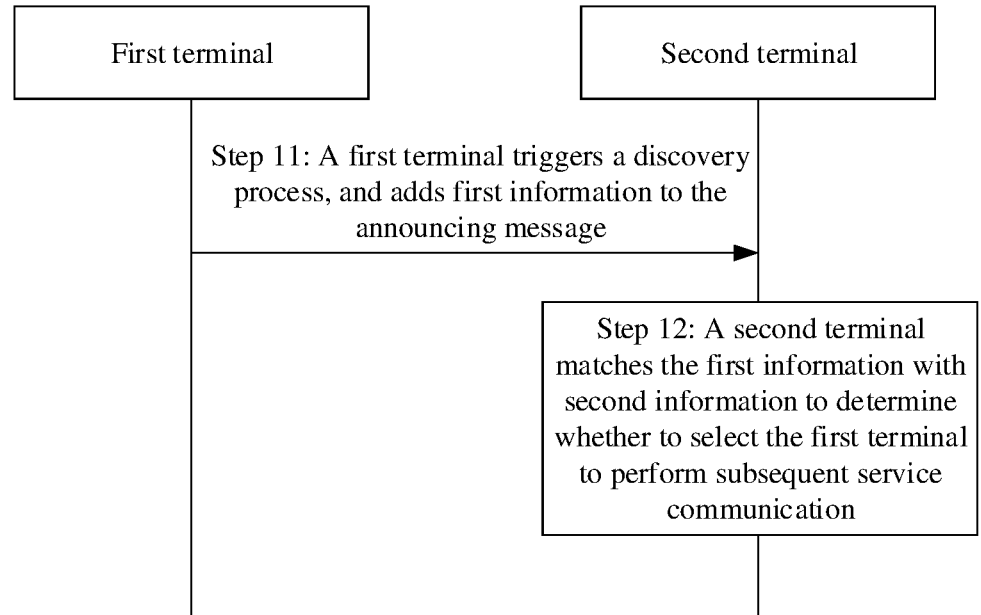
Figure 4B:
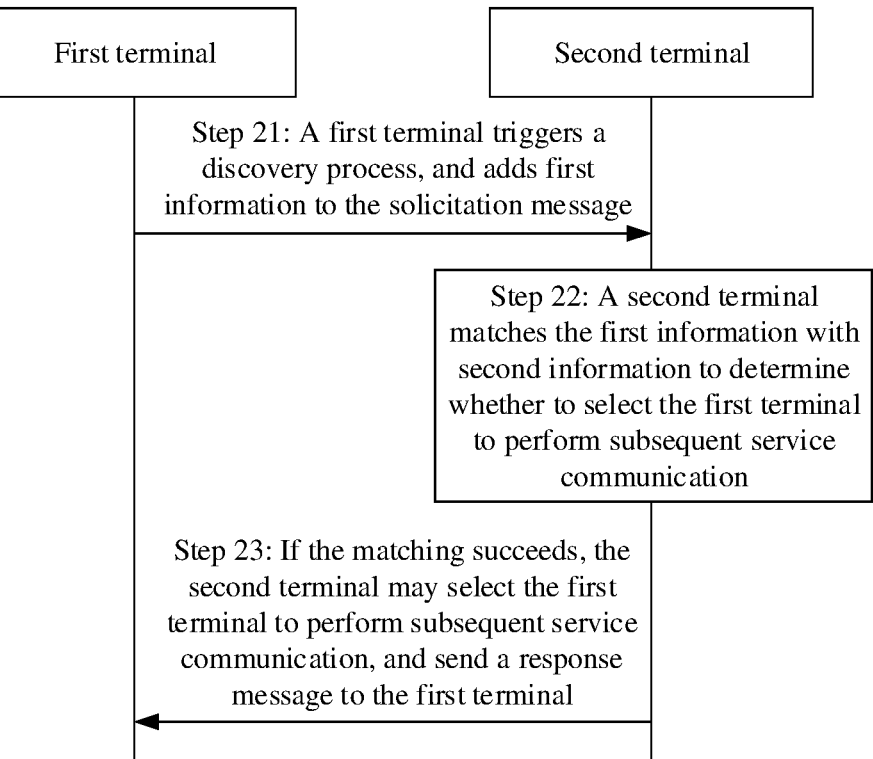

The first information may be carried in a discovery message or a direct communication request message. The discovery message can reuse messages in an SL one-step discovery mechanism (discovery model A) and a two-step discovery mechanism (discovery model B). FIG. 4A is a schematic flowchart of a one-step discovery mechanism. A discovery message may reuse an announcing message, that is, the announcing message may be used as a discovery message. As shown in FIG. 4B, a discovery message may reuse a solicitation message, that is, the solicitation message may be used as a discovery message. For example, in a discovery process triggered by the first terminal, a broadcast discovery message carries the first information, or in a discovery phase, the first terminal discovers and selects the second terminal, and after the discovery phase, the first terminal sends a direct communication request message that carries the first information to the second terminal.

The first information may be preconfigured on the first terminal, or the first information is configured by a network device.

In an embodiment of this application, after sending the first information to the second terminal, the method further includes:

receiving a discovery response message sent by the second terminal;

or receiving a direct communication accept message or a direct communication reject message sent by the second terminal.

If the first information is carried in the discovery message, the first terminal sends the discovery message to the second terminal, and the second terminal matches the first information with the support information and/or the preferential information of the second terminal for the communication, and sends the discovery response message to the first terminal, and the first terminal receives the discovery response message sent by the second terminal.

If the first information is carried in the direct communication request message, the first terminal sends the discovery message to the second terminal, and the second terminal matches the first information with the support information and/or the preferential information of the second terminal for the communication. If the matching succeeds, the second terminal sends a direct communication accept message to the first terminal, and the first terminal receives the direct communication accept message sent by the second terminal. If the matching fails, the second terminal sends a direct communication reject message to the first terminal, and the first terminal receives the direct communication reject message sent by the second terminal.

In the foregoing descriptions, the discovery response message carries second information;

or the direct communication accept message carries second information;

or the direct communication reject message carries second information; where the second information is used to indicate support information and/or preferential information of the second terminal for the communication.

When sending the discovery response message, the direct communication accept message, or the direct communication reject message to the first terminal, the second terminal may also send second information to the first terminal, to notify the first terminal of the support information and/or the preferential information of the first terminal for the communication.

Optionally, in a case that the first communication is SL communication and the second communication is WLAN communication, the second information may be the same as content indicated by the first information. For example, the support information indicated by the second information is used to indicate one of the following:

that only the SL communication is supported;

that only the WLAN communication is supported; and that aggregated communication of SL and WLAN is supported; and/or the preferential information that the second information is used to indicate is used to indicate one of the following:

that the SL communication is preferential;

that the WLAN communication is preferential; and that aggregated communication of SL and WLAN is preferential.

In addition, the second information is further used to indicate at least one of service information of the SL communication or address information of the SL communication;

or the second information is further used to indicate at least one of service information of the WLAN communication or address information of the WLAN communication;

or the second information is further used to indicate at least one of service information of aggregated communication of SL and WLAN or address information of the aggregated communication of SL and WLAN.

Figure 3:
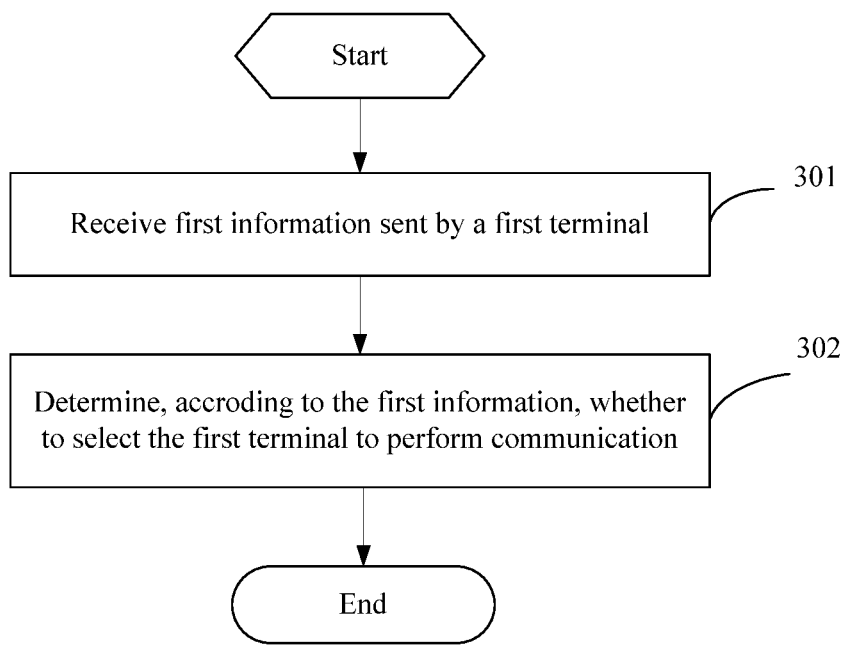
FIG. 3 is a flowchart of an information receiving method according to an embodiment of this application.

FIG. 3 is a flowchart of an information receiving method according to an embodiment of this application. The information receiving method is applied to a second terminal and includes:

Step 301: Receive first information sent by a first terminal, where the first information is used to indicate support information and/or preferential information of the first terminal for communication, the communication includes at least one of first communication or second communication, and the first communication or the second communication is sidelink SL communication.

Step 302: Determine, according to the first information, whether to select the first terminal to perform communication.

After a discovery phase or a discovery phase (for example, a direct communication establishment phase), the second terminal receives the first information sent by the first terminal. The second terminal may learn, based on the first information sent by the first terminal, the support information and/or the preferential information of the first terminal for the communication, and the second terminal may determine, based on the first information and the support information and/or the preferential information of the second terminal for the communication, whether to select the first terminal to perform subsequent service communication.

If the second terminal does not select the first terminal to perform subsequent service communication, the second terminal may send a response message for rejecting communication such as a direct communication rejection message to the first terminal. Alternatively, if the second terminal does not select the first terminal to perform subsequent service communication, the second terminal may not send a message to the first terminal, that is, the second terminal does not respond to the first information sent by the first terminal. If the second terminal selects the first terminal to perform subsequent service communication, the second terminal may send a response message for accepting communication to the first terminal, such as a direct communication accept message.

For example, if the first information indication supports aggregated communication of sidelink (SL) and a wireless local area network (WLAN), and the second information indication supports SL communication only, the second terminal cannot select the first terminal to perform subsequent service communication. If the first information indicates that the aggregated communication of SL and WLAN is supported, and the second information indicates that the aggregated communication of SL and WLAN is supported, the second terminal may select the first terminal to perform subsequent service communication.

In this embodiment, the first information sent by the first terminal is received, where the first information is used to indicate the support information and/or the preferential information of the first terminal for the communication, the communication includes at least one of the first communication or the second communication, and the first communication or the second communication is sidelink SL communication; and whether to select the first terminal for communication is determined according to the first information, so that the second terminal learns whether the first terminal matches communication supported or inclined by the first terminal, so that the second terminal determines whether to select the first terminal to perform subsequent service communication, thereby improving service transmission performance between terminals.

In an embodiment of this application, the first communication is SL communication, and the second communication is WLAN communication or Bluetooth communication.

In the foregoing descriptions, in a case that the first communication is SL communication and the second communication is wireless local area network WLAN communication, support information indicated by the first information is used to indicate one of the following:

that only the SL communication is supported;

that only the WLAN communication is supported; and that aggregated communication of SL and WLAN is supported; and/or the preferential information is used to indicate one of the following:

that the SL communication is preferential;

that the WLAN communication is preferential; and that aggregated communication of SL and WLAN is preferential.

Optionally, the preferential information may be changed based on an actual situation. For example, if an initiated service has a relatively high requirement for reliability and continuity, and/or WLAN link quality is poor, the preferential information may indicate that the aggregated communication of SL and WLAN or the SL communication is preferential. If a quality of service (QoS) requirement of the initiated service is low, and/or WLAN link quality is good, the preferential information may indicate that the WLAN communication is preferential, or the aggregated communication of SL and WLAN is preferential.

In other words, the preferential information is determined based on a service policy, and/or the preferential information is determined based on link quality. In other words, the preferential information may be determined based on a service policy (static information), may be determined based on an actual link condition (dynamic information), or may be determined based on both a service policy and an actual link condition.

Optionally, the first information is further used to indicate at least one of service information of the SL communication or address information of the SL communication;

or the first information is further used to indicate at least one of service information of the WLAN communication or address information of the WLAN communication;

or the first information is further used to indicate at least one of service information of aggregated communication of SL and WLAN or address information of the aggregated communication of SL and WLAN.

In the foregoing descriptions, service information of the aggregated communication of SL and WLAN may be understood as: being used to carry an SL service or a WLAN service. Correspondingly, address information of the aggregated communication of SL and WLAN may be address information of the SL communication, or may be address information of the WLAN communication.

Optionally, the service information of the SL communication may include a service type (such as public safety or commercial), a service identifier (service ID), service QoS, and service code.

Optionally, the service information of the WLAN communication may include a service type (such as public safety or commercial), a service identifier (service ID), service QoS, and service code.

In the foregoing descriptions, the address information of the WLAN communication includes at least one of WLAN port configuration, WLAN identifier information, a WLAN version, or a WLAN protocol.

The WLAN identifier information includes:

a basic service set identifier (BSSID), that is, a wireless fidelity (wifi) local area network address (Media Access Control Address, MAC);

a homogenous extended service set identifier (Homogenous Extended Service Set Identifier, HESSID) defined in IEEE802 (HESSID defined in IEEE802);

a service set identifier (SSID) defined in IEEE802 (SSID defined in IEEE 802); and a WLAN version/protocol such as wifi 1-6, 802.11 a/b/g/n/ac/ax, and an Ethernet type (EtherType) 0x9E65.

In the foregoing descriptions, in a case that the first communication is SL communication and the second communication is Bluetooth communication, support information indicated by the first information is used to indicate one of the following:

that only the SL communication is supported;

that only Bluetooth communication is supported;

that aggregated communication of SL and Bluetooth is supported; and/or the preferential information is used to indicate one of the following:

that the SL communication is preferential;

that Bluetooth communication is preferential;

that aggregated communication of SL and Bluetooth is preferential.

Optionally, the first information is further used to indicate at least one of service information of the SL communication or address information of the Bluetooth communication;

or the first information is further used to indicate at least one of service information of the Bluetooth communication or address information of the Bluetooth communication;

or the first information is further used to indicate at least one of service information of aggregated communication of SL and Bluetooth or address information of the aggregated communication of SL and Bluetooth.

In the foregoing descriptions, service information of the aggregated communication of SL and Bluetooth may be understood as: being used to carry an SL service or a Bluetooth service. Correspondingly, address information of the aggregated communication of SL and Bluetooth may be address information of the SL communication, or may be address information of the Bluetooth communication.

Address information of the Bluetooth communication includes a Bluetooth public address.

The first information may be carried in a discovery message or a direct communication request message. For example, in a discovery process triggered by the first terminal, a broadcast discovery message carries the first information, or in a discovery phase, the first terminal discovers and selects the second terminal, and after the discovery phase, the first terminal sends a direct communication request message that carries the first information to the second terminal.

The first information may be preconfigured on the first terminal, or the first information is configured by a network device.

In an embodiment of this application, after receiving the first information sent by the first terminal, the method further includes:

sending a discovery response message to the first terminal;

or sending a direct communication accept message or a direct communication reject message to the first terminal.

In this embodiment, sending the discovery response message to the first terminal, or sending the direct communication accept message or the direct communication reject message to the first terminal may be understood as a step in which the second terminal selects the first terminal to perform communication, and the foregoing step is included in step 302 for execution. In other words, the determining, according to the first information, whether to select the first terminal for communication includes: sending a discovery response message to the first terminal; or sending a direct communication accept message or a direct communication reject message to the first terminal.

Alternatively, the sending the discovery response message to the first terminal or sending the direct communication accept message or the direct communication reject message to the first terminal is performed after step 302 of determining, according to the first information, whether to select the first terminal to perform communication. In this case, the second terminal determines, according to the first information, whether to select the first terminal for communication, and sends response information to the first terminal, that is, sends a discovery response message to the first terminal; or sends a direct communication accept message or a direct communication reject message to the first terminal.

Optionally, in a case that the second terminal may select the first terminal to perform communication, the second terminal may send the discovery response message to the first terminal, where the discovery response message is used to indicate that the second terminal selects the first terminal for communication; or the second terminal may send the direct communication accept message to the first terminal.

In a case that the second terminal may reject to select the first terminal to perform communication, the second terminal may send the discovery response message to the first terminal, where the discovery response message is used to indicate that the second terminal rejects to select the first terminal to perform communication; or the second terminal may send the direct communication reject message to the first terminal.

In addition, the second terminal may further send the discovery response message to the first terminal in a case that the second terminal selects the first terminal to perform communication, and the second terminal does not send a message to the first terminal in a case that the second terminal rejects to select the first terminal to perform communication.

If the first information is carried in a discovery message, the first terminal sends the discovery message to the second terminal, and the second terminal matches the first information with the support information and/or the preferential information of the second terminal for the communication, and sends the discovery response message to the first terminal.

If the first information is carried in the direct communication request message, the first terminal sends a discovery message to the second terminal, and the second terminal matches the first information with the support information and/or the preferential information of the second terminal for the communication, and if the matching succeeds, sends a direct communication accept message to the first terminal, or if the matching fails, sends a direct communication reject message to the first terminal.

In the foregoing descriptions, the discovery response message carries second information;

or the direct communication accept message carries second information;

or the direct communication reject message carries second information; where the second information is used to indicate support information and/or preferential information of the second terminal for the communication.

When sending the discovery response message, the direct communication accept message, or the direct communication reject message to the first terminal, the second terminal may also send second information to the first terminal, to notify the first terminal of the support information and/or the preferential information of the first terminal for the communication.

Optionally, in a case that the first communication is SL communication and the second communication is WLAN communication, support information indicated by the second information is used to indicate one of the following:

that only the SL communication is supported;

that only the WLAN communication is supported; and that aggregated communication of SL and WLAN is supported; and/or the preferential information that the second information is used to indicate is used to indicate one of the following:

that the SL communication is preferential;

that the WLAN communication is preferential; and that aggregated communication of SL and WLAN is preferential.

In addition, the second information is further used to indicate at least one of service information of the SL communication or address information of the SL communication;

or the second information is further used to indicate at least one of service information of the WLAN communication or address information of the WLAN communication;

or the second information is further used to indicate at least one of service information of aggregated communication of SL and WLAN or address information of the aggregated communication of SL and WLAN.

The foregoing process is described below by using an example.

FIG. 4A is a flowchart of a one-step discovery mechanism.

Step 11: A first terminal triggers a discovery process, and adds first information to a broadcast message (i.e., the announcing message), where the first information is used to indicate support information and/or preferential information of the first terminal for communication.

Step 12: A second terminal matches the first information with second information to determine whether to select the first terminal to perform subsequent service communication, where the second information is used to indicate support information and/or preferential information of the second terminal for communication.

For example, if the first information indication indicates that aggregated communication of SL and WLAN is supported, and the second information indication indicates that only SL communication is supported, the second terminal cannot select the first terminal to perform subsequent service communication.

For another example, if the first information indication indicates that aggregated communication of SL and WLAN is supported, and the second information indication indicates that the aggregated communication of SL and WLAN is supported, the second terminal can select the first terminal to perform subsequent service communication.

The first information and the second information may be respectively preconfigured on the first terminal and the second terminal, or may be configured by using a network device.

FIG. 4B is a flowchart of a two-step discovery mechanism.

Step 21: A first terminal triggers a discovery process, and adds first information to a broadcast message (i.e., the solicitation message), where the first information is used to indicate support information and/or preferential information of the first terminal for communication.

Step 22: A second terminal matches the first information with second information to determine whether to select the first terminal to perform subsequent service communication, where the second information is used to indicate support information and/or preferential information of the second terminal for communication.

For example, if the first information indication indicates that aggregated communication of SL and WLAN is supported, and the second information indication indicates that only SL communication is supported, the second terminal cannot select the first terminal to perform subsequent service communication.

For another example, if the first information indication indicates that aggregated communication of SL and WLAN is supported, and the second information indication indicates that the aggregated communication of SL and WLAN is supported, the second terminal can select the first terminal to perform subsequent service communication.

Step 23: If the matching succeeds, the second terminal may select the first terminal to perform subsequent service communication, and send a response message to the first terminal. Optionally, the response message carries the second information.

The first information and the second information may be respectively preconfigured on the first terminal and the second terminal, or may be configured by using a network device.

FIG. 4C is a flowchart of a discovery mechanism in a direct communication establishment phase.

Step 30: In a discovery phase, a first terminal discovers and selects a second terminal.

Step 31: The first terminal sends a direct communication request message that carries the first information to the second terminal.

Step 32: The second terminal matches the first information with second information to determine whether to select the first terminal to perform subsequent service communication, where the second information is used to indicate support information and/or preferential information of the second terminal for communication.

For example, if the first information indication indicates that aggregated communication of SL and WLAN is supported, and the second information indication indicates that only SL communication is supported, the second terminal cannot select the first terminal to perform subsequent service communication.

For another example, if the first information indication indicates that aggregated communication of SL and WLAN is supported, and the second information indication indicates that the aggregated communication of SL and WLAN is supported, the second terminal can select the first terminal to perform subsequent service communication.

Step 33: If the matching succeeds, the second terminal may select the first terminal to perform subsequent service communication, and send a direct communication accept message to the first terminal. If the matching fails, the second terminal does not select the first terminal to perform subsequent service communication, and sends a direct communication reject message to the first terminal. Optionally, the direct communication accept message or the direct communication reject message carries the second information.

Through a discovery process, a terminal that supports an aggregated communication of SL and WLAN function is discovered, so that service transmission between terminals is subsequently performed through the aggregated communication of SL and WLAN, thereby ensuring service experience of the terminal and system efficiency.

FIG. 5 is a structural diagram of an information sending apparatus according to an embodiment of this application. An information sending apparatus 500 is applied to a first terminal and includes:

a sending module 501, configured to send first information to a second terminal; where the first information is used to indicate support information and/or preferential information of the first terminal for communication, the communication includes at least one of first communication or second communication, and the first communication or the second communication is sidelink SL communication.

Optionally, the first information is carried in a discovery message or a direct communication request message.

Optionally, the information sending apparatus 500 further includes a receiving module, configured to:

receive a discovery response message sent by the second terminal;

or receive a direct communication accept message or a direct communication reject message sent by the second terminal.

Optionally, the discovery response message carries second information;

or the direct communication accept message carries second information;

or the direct communication reject message carries second information; where the second information is used to indicate support information and/or preferential information of the second terminal for the communication.

Optionally, the preferential information is determined based on a service policy, and/or the preferential information is determined based on link quality.

Optionally, in a case that the first communication is SL communication and the second communication is wireless local area network WLAN communication, the support information is used to indicate one of the following:

that only the SL communication is supported;

that only the WLAN communication is supported; and that aggregated communication of SL and WLAN is supported; and/or the preferential information is used to indicate one of the following:

that the SL communication is preferential;

that the WLAN communication is preferential; and that aggregated communication of SL and WLAN is preferential.

Optionally, the first information is further used to indicate at least one of service information of the WLAN communication or address information of the WLAN communication; or the first information is further used to indicate at least one of service information of the WLAN communication or address information of the WLAN communication; or the first information is further used to indicate at least one of service information of aggregated communication of SL and WLAN or address information of the aggregated communication of SL and WLAN.

Optionally, the address information of the WLAN communication includes at least one of WLAN port configuration, WLAN identifier information, a WLAN version, or a WLAN protocol.

Optionally, the WLAN identifier information includes a basic service set identifier, a homogeneous extended service set identifier, and a service set identifier.

Optionally, the first information is preconfigured on the first terminal, or the first information is configured by a network device.

Optionally, the first communication is SL communication, and the second communication is WLAN communication or Bluetooth communication.

The information sending apparatus in this embodiment of this application may be an apparatus, or may be a component, an integrated circuit, or a chip in a terminal. The apparatus may be a mobile terminal, or may be a non-mobile terminal. For example, the mobile terminal may include but is not limited to the foregoing listed types of terminals 11. The non-mobile terminal may be a server, a network attached storage (NAS), a personal computer (PC), a television (TV), a teller machine, or a self-service machine. This is not specifically limited in this embodiment of this application.

The information sending apparatus in this embodiment of this application may be an apparatus with an operating system. The operating system may be an Android operating system, may be an iOS operating system, or may be another possible operating system. This is not specifically limited in this embodiment of this application.

The information sending apparatus 500 provided in this embodiment of this application can implement each process implemented in the method embodiment of FIG. 2, and a same technical effect is achieved. To avoid repetition, details are not described herein again.

Figure 6:
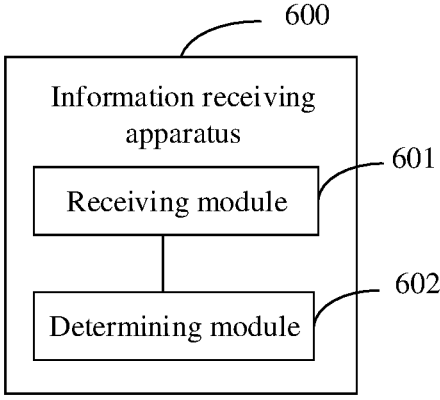
FIG. 6 is a structural diagram of an information receiving apparatus according to an embodiment of this application.

FIG. 6 is a structural diagram of an information receiving apparatus according to an embodiment of this application. An information receiving apparatus 600 is applied to a second terminal and includes:

a receiving module 601, configured to receive first information sent by a first terminal, where the first information is used to indicate support information and/or preferential information of the first terminal for communication, the communication includes at least one of first communication or second communication, and the first communication or the second communication is sidelink SL communication; and a determining module 602, configured to determine, according to the first information, whether to select the first terminal to perform communication.

Optionally, the first information is carried in a discovery message or a direct communication request message.

Optionally, the information receiving apparatus 600 further includes a sending module, configured to:

send a discovery response message to the first terminal; or send a direct communication accept message or a direct communication reject message to the first terminal.

Optionally, the discovery response message carries second information; or the direct communication accept message carries second information; or the direct communication reject message carries second information; where the second information is used to indicate support information and/or preferential information of the second terminal for the communication.

Optionally, the preferential information is determined based on a service policy, and/or the preferential information is determined based on link quality.

Optionally, in a case that the first communication is SL communication and the second communication is wireless local area network WLAN communication, the support information is used to indicate one of the following:

that only the SL communication is supported;

that only the WLAN communication is supported; and that aggregated communication of SL and WLAN is supported; and/or the preferential information is used to indicate one of the following:

that the SL communication is preferential;

that the WLAN communication is preferential; and that aggregated communication of SL and WLAN is preferential.

Optionally, the first information is further used to indicate at least one of service information of the WLAN communication or address information of the WLAN communication; or the first information is further used to indicate at least one of service information of the WLAN communication or address information of the WLAN communication; or the first information is further used to indicate at least one of service information of aggregated communication of SL and WLAN or address information of the aggregated communication of SL and WLAN.

Optionally, the address information of the WLAN communication includes at least one of WLAN port configuration, WLAN identifier information, a WLAN version, or a WLAN protocol.

Optionally, the WLAN identifier information includes a basic service set identifier, a homogeneous extended service set identifier, and a service set identifier.

Optionally, the first information is preconfigured on the first terminal, or the first information is configured by a network device.

Optionally, the first communication is SL communication, and the second communication is WLAN communication or Bluetooth communication.

The information receiving apparatus 600 provided in this embodiment of this application can implement each process implemented in the method embodiment of FIG. 3, and a same technical effect is achieved. To avoid repetition, details are not described herein again.

Figure 7:
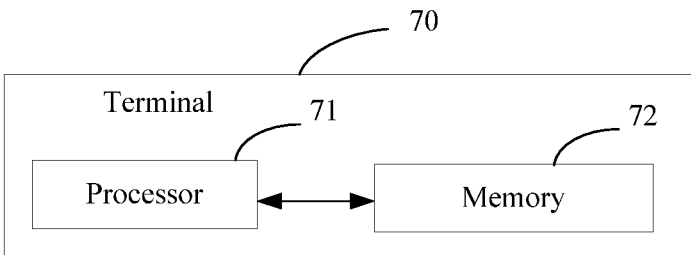
FIG. 7 is a structural diagram of a terminal according to an embodiment of this application.

As shown in FIG. 7, an embodiment of this application further provides a terminal 70. The terminal 70 includes a processor 71, a memory 72, and a program or an instruction that is stored in the memory 72 and executable on the processor 71. When the program or the instruction is executed by the processor 71, each process in the embodiment shown in FIG. 2 or FIG. 3 is implemented, and a same technical effect can be achieved.

Figure 8:
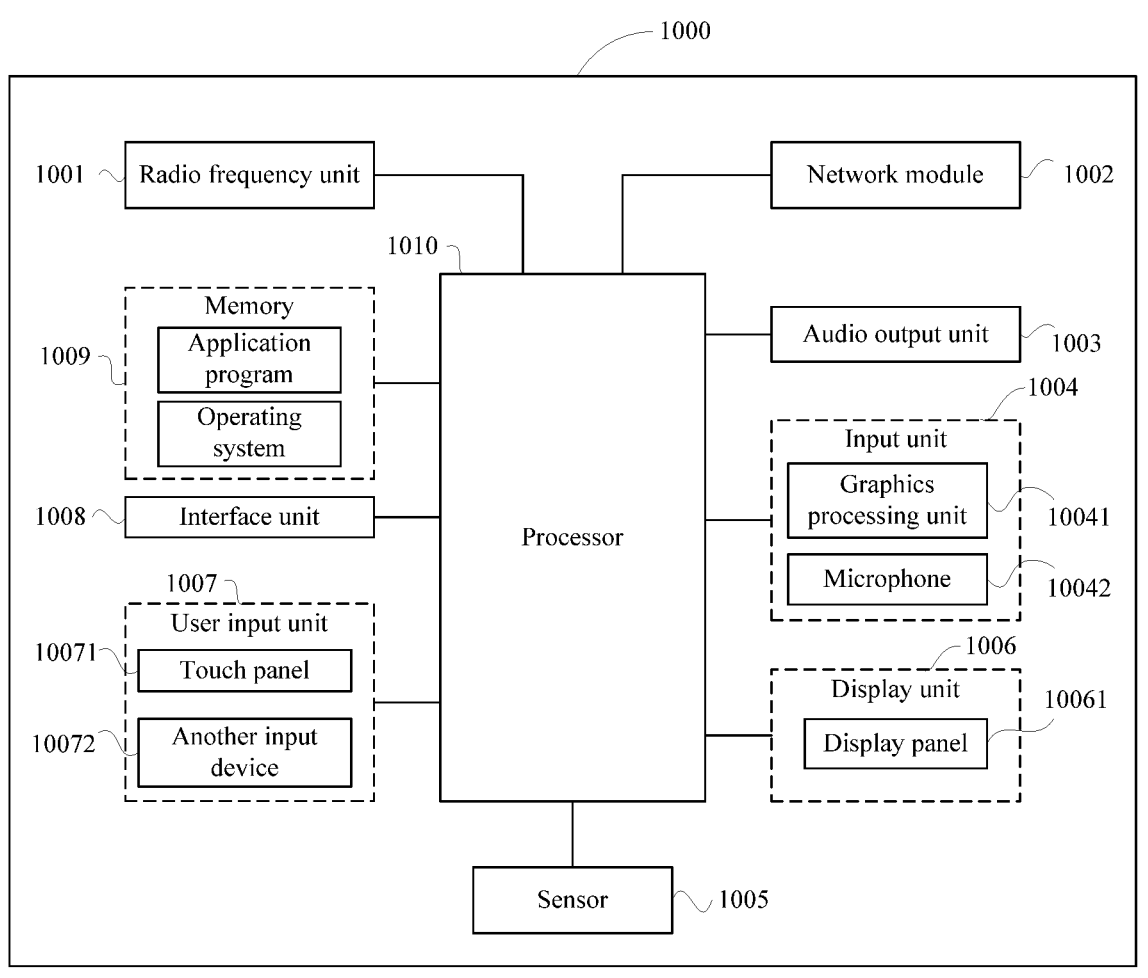
FIG. 8 is a structural diagram of another terminal according to an embodiment of this application.

FIG. 8 is a schematic diagram of a hardware structure of a terminal according to an embodiment of this application.

The terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

It may be understood by a person skilled in the art that the terminal 1000 may further include a power supply (such as a battery) that supplies power to each component. The power supply may be logically connected to the processor 1010 by using a power management system, to implement functions such as charging, discharging, and power consumption management by using the power management system. A structure of the terminal shown in FIG. 8 does not constitute a limitation on the terminal device, and may include more or fewer parts than those shown in the figure, or combine some parts, or have different part arrangements. Details are not described herein again.

It should be understood that, in this embodiment of this application, the input unit 1004 may include a graphics processing unit (GPU) 10041 and a microphone 10042. The graphics processing unit 10041 processes image data of a static picture or a video obtained by an image capture apparatus (such as a camera) in a video capture mode or an image capture mode. The display unit 1006 may include a display panel 10061, and the display panel 10061 may be configured in a form of a liquid crystal display, an organic light emitting diode, or the like. The user input unit 1007 includes a touch panel 10071 and another input device 10072. The touch panel 10071 is also referred to as a touchscreen. The touch panel 10071 may include two parts: a touch detection apparatus and a touch controller. The another input device 10072 may include but is not limited to one or more of a physical keyboard, a function key (such as a volume control key or an on/off key), a trackball, a mouse, a joystick, and the like. Details are not described herein.

In this embodiment of this application, after receiving downlink data from a network side device, the radio frequency unit 1001 sends the downlink data to the processor 1010 for processing, and sends uplink data to the base station. Generally, the radio frequency unit 1001 includes but is not limited to an antenna, at least one amplifier, a transceiver, a coupler, a low noise amplifier, a duplexer, and the like.

The memory 1009 may be configured to store a software program or an instruction and various data. The memory 1009 may mainly include a storage program or instruction area and a storage data area, where the storage program or instruction area may store an operating system, an application program or an instruction required by at least one function (such as a sound play function or an image play function), and the like. In addition, the memory 1009 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one magnetic disk storage device, a flash memory device, or another non-volatile solid-state storage device.

The processor 1010 may include one or more processing units. Optionally, the processor 1010 may be integrated with an application processor and a modem processor. The application processor mainly processes an operating system, a user interface, an application program or an instruction, and the like, and the modem processor mainly processes wireless communication, for example, a baseband processor. It may be understood that the modem processor may also not be integrated into the processor 1010.

In a case that the terminal 1000 is a first terminal, the radio frequency unit 1001 is configured to send first information to a second terminal.

The first information is used to indicate support information and/or preferential information of the first terminal for communication, the communication includes at least one of first communication or second communication, and the first communication or the second communication is sidelink SL communication.

Optionally, the first information is carried in a discovery message or a direct communication request message.

Optionally, the radio frequency unit 1001 is further configured to receive a discovery response message sent by the second terminal;

or receive a direct communication accept message or a direct communication reject message sent by the second terminal.

Optionally, the discovery response message carries second information;

or the direct communication accept message carries second information;

or the direct communication reject message carries second information; where the second information is used to indicate support information and/or preferential information of the second terminal for the communication.

Optionally, the preferential information is determined based on a service policy, and/or the preferential information is determined based on link quality.

Optionally, in a case that the first communication is SL communication and the second communication is wireless local area network WLAN communication, the support information is used to indicate one of the following:

that only the SL communication is supported;

that only the WLAN communication is supported; and that aggregated communication of SL and WLAN is supported; and/or the preferential information is used to indicate one of the following:

that the SL communication is preferential;

that the WLAN communication is preferential; and that aggregated communication of SL and WLAN is preferential.

Optionally, the first information is further used to indicate at least one of service information of the WLAN communication or address information of the WLAN communication; or the first information is further used to indicate at least one of service information of the WLAN communication or address information of the WLAN communication; or the first information is further used to indicate at least one of service information of aggregated communication of SL and WLAN or address information of the aggregated communication of SL and WLAN.

Optionally, the address information of the WLAN communication includes at least one of WLAN port configuration, WLAN identifier information, a WLAN version, or a WLAN protocol.

Optionally, the WLAN identifier information includes a basic service set identifier, a homogeneous extended service set identifier, and a service set identifier.

Optionally, the first information is preconfigured on the first terminal, or the first information is configured by a network device.

Optionally, the first communication is SL communication, and the second communication is WLAN communication or Bluetooth communication.

The first terminal provided in the foregoing embodiment can implement each process implemented in the method embodiment of FIG. 2, and a same technical effect is achieved. To avoid repetition, details are not described herein again.

In a case that the terminal 1000 is a second terminal, the radio frequency unit 1001 is configured to receive first information sent by a first terminal, where the first information is used to indicate support information and/or preferential information of the first terminal for communication, the communication includes at least one of first communication or second communication, and the first communication or the second communication is sidelink SL communication; and The processor 1010 is configured to determine, according to the first information, whether to select the first terminal to perform communication.

Optionally, the first information is carried in a discovery message or a direct communication request message.

Optionally, the radio frequency unit 1001 is further configured to:

send a discovery response message to the first terminal; or send a direct communication accept message or a direct communication reject message to the first terminal.

Optionally, the discovery response message carries second information;

or the direct communication accept message carries second information;

or the direct communication reject message carries second information; where the second information is used to indicate support information and/or preferential information of the second terminal for the communication.

Optionally, the preferential information is determined based on a service policy, and/or the preferential information is determined based on link quality.

Optionally, in a case that the first communication is SL communication and the second communication is wireless local area network WLAN communication, the support information is used to indicate one of the following:

that only the SL communication is supported;

that only the WLAN communication is supported; and that aggregated communication of SL and WLAN is supported; and/or the preferential information is used to indicate one of the following:

that the SL communication is preferential;

that the WLAN communication is preferential; and that aggregated communication of SL and WLAN is preferential.

Optionally, the first information is further used to indicate at least one of service information of the WLAN communication or address information of the WLAN communication; or the first information is further used to indicate at least one of service information of the WLAN communication or address information of the WLAN communication; or the first information is further used to indicate at least one of service information of aggregated communication of SL and WLAN or address information of the aggregated communication of SL and WLAN.

Optionally, the address information of the WLAN communication includes at least one of WLAN port configuration, WLAN identifier information, a WLAN version, or a WLAN protocol.

Optionally, the WLAN identifier information includes a basic service set identifier, a homogeneous extended service set identifier, and a service set identifier.

Optionally, the first information is preconfigured on the first terminal, or the first information is configured by a network device.

Optionally, the first communication is SL communication, and the second communication is WLAN communication or Bluetooth communication.

The first terminal provided in the foregoing embodiment can implement each process implemented in the method embodiment of FIG. 3, and a same technical effect is achieved. To avoid repetition, details are not described herein again.

An embodiment of this application further provides a non-transitory readable storage medium. A program or an instruction is stored in the non-transitory readable storage medium. When the program or the instruction is executed by a processor, each process of the method embodiment in FIG. 2 or FIG. 3 can be implemented, and a same technical effect can be achieved. To avoid repetition, details are not described herein.

The processor is a processor in the terminal in the foregoing embodiment. The non-transitory readable storage medium includes a non-transitory computer-readable storage medium such as a read-only memory (ROM), a random access memory (RAM), a magnetic disk, an optical disc, or the like.

An embodiment of this application further provides a chip. The chip includes a processor and a communication interface, the communication interface is coupled to the processor, and the processor is configured to run a program or an instruction of a network side device to implement the processes of the method embodiments in FIG. 2 and FIG. 3, and a same technical effect can be achieved. To avoid repetition, details are not described herein again.

It should be understood that the chip mentioned in this embodiment of this application may also be referred to as a system-level chip, a system chip, a chip system, or a system on a chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

A person of ordinary skill in the art may recognize that, with reference to the examples described in the embodiments disclosed herein, units and algorithm steps may be implemented by electronic hardware or a combination of computer software and electronic hardware. Whether these functions are implemented by using hardware or software depends on the specific application and design constraints of the technical solution. A person skilled in the art may use different methods for each particular application to implement the described functions, but such implementation shall not be considered to be outside the scope of the present disclosure.

It may be clearly understood by a person skilled in the art that, for convenience and brevity of description, for a specific working process of the foregoing described system, apparatus, and unit, reference may be made to a corresponding process in the foregoing method embodiments, and details are not described herein again.

In the embodiments provided in this application, it should be understood that the disclosed apparatus and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. In addition, the displayed or discussed mutual coupling or direct coupling or communication connection may be through some interfaces, indirect coupling or communication connection of the apparatus or unit, and may be in an electrical, mechanical, or another form.

The units described as separate parts may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, functional units in the embodiments of the present disclosure may be integrated into one processing unit, or each unit may exist separately physically, or two or more units may be integrated into one unit.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

It may be understood that the embodiments described in the embodiments of the present disclosure may be implemented by hardware, software, firmware, middleware, microcode, or a combination thereof. For hardware implementation, a module, a unit, a subunit, or the like may be implemented in one or more application specific integrated circuits (ASIC), a digital signal processor (DSP), a digital signal processing device (DSP Device, DSPD), a programmable logic device (PLD), a field-programmable gate array (FPGA), a general purpose processor, a controller, a microcontroller, a microprocessor, another electronic unit configured to perform the functions described in the present disclosure, or a combination thereof.

For software implementations, the techniques described in the embodiments of the present disclosure may be implemented by modules (for example, processes and functions) that perform the functions described in the embodiments of the present disclosure. The software code may be stored in a memory and executed by a processor. The memory may be implemented in or outside the processor.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

What is claimed is:

1. An information sending method, applied to a first terminal and comprising:

sending first information to a second terminal; wherein the first information is used to indicate support information or preferential information of the first terminal for communication, and the communication comprises first communication and second communication, wherein in response to the first communication being sidelink (SL) communication and the second communication being wireless local area network (WLAN) communication, the support information is used to indicate one of the following:

that only the SL communication is supported;

that only the WLAN communication is supported; and that aggregated communication of SL and WLAN is supported; or the preferential information is used to indicate that aggregated communication of SL and WLAN is preferential.

2. The method according to claim 1, wherein the first information is carried in a discovery message or a direct communication request message; or the first information satisfies any one of the following:

that the first information is preconfigured on the first terminal; and that the first information is configured by a network device.

3. The method according to claim 1, after sending the first information to the second terminal, further comprising:

receiving a discovery response message sent by the second terminal;

or receiving a direct communication accept message or a direct communication reject message sent by the second terminal;

wherein second information is carried in any one of the following:

the discovery response message;

the direct communication accept message; and the direct communication reject message; wherein the second information is used to indicate support information or preferential information of the second terminal for the communication.

4. The method according to claim 1, wherein the first information is further used to indicate at least one of service information of the SL communication or address information of the SL communication;

or the first information is further used to indicate at least one of service information of the WLAN communication or address information of the WLAN communication;

or the first information is further used to indicate at least one of service information of the aggregated communication of SL and WLAN or address information of the aggregated communication of SL and WLAN.

5. The method according to claim 4, wherein the address information of the WLAN communication comprises at least one of WLAN port configuration, WLAN identification information, a WLAN version, or a WLAN protocol; and the WLAN identification information comprises a basic service set identifier, a homogeneous extended service set identifier, and a service set identifier.

6. The method according to claim 1, wherein the preferential information is determined based on at least one of the following:

a service policy; or link quality.

7. An information receiving method, applied to a second terminal and comprising:

receiving first information sent by a first terminal, wherein the first information is used to indicate support information or preferential information of the first terminal for communication, and the communication comprises first communication and second communication, wherein in response to the first communication being sidelink (SL) communication and the second communication being wireless local area network (WLAN) communication, the support information is used to indicate one of the following:

that only the SL communication is supported;

that only the WLAN communication is supported; and that aggregated communication of SL and WLAN is supported; or the preferential information is used to indicate that aggregated communication of SL and WLAN is preferential; and determining, according to the first information, whether to select the first terminal to perform communication.

8. The method according to claim 7, wherein the first information is carried in a discovery message or a direct communication request message; or the first information satisfies any one of the following:

that the first information is preconfigured on the first terminal; and that the first information is configured by a network device.

9. The method according to claim 7, after receiving the first information sent by the first terminal, further comprising:

sending a discovery response message to the first terminal;

or sending a direct communication accept message or a direct communication reject message to the first terminal;

wherein second information is carried in any one of the following:

the discovery response message;

the direct communication accept message; and the direct communication reject message; wherein the second information is used to indicate support information or preferential information of the second terminal for the communication.

10. The method according to claim 7, wherein the first information is further used to indicate at least one of service information of the SL communication or address information of the SL communication;

or the first information is further used to indicate at least one of service information of the WLAN communication or address information of the WLAN communication;

or the first information is further used to indicate at least one of service information of the aggregated communication of SL and WLAN or address information of the aggregated communication of SL and WLAN.

11. The method according to claim 10, wherein the address information of the WLAN communication comprises at least one of WLAN port configuration, WLAN identification information, a WLAN version, or a WLAN protocol; and the WLAN identification information comprises a basic service set identifier, a homogeneous extended service set identifier, and a service set identifier.

12. The method according to claim 7, wherein the preferential information is determined based on at least one of the following:

a service policy; or link quality.

13. A terminal, the terminal being a second terminal, the second terminal comprising a processor, a memory, and a program or instruction that is stored in the memory and executable on the processor, wherein the program or the instruction, when executed by the processor, causes the second terminal to perform the information receiving method in claim 7.

14. The terminal according to claim 13, wherein the program or the instruction, when executed by the processor, causes the second terminal to further perform:

sending a discovery response message to the first terminal;

or sending a direct communication accept message or a direct communication reject message to the first terminal;

wherein second information is carried in any one of the following:

the discovery response message;

the direct communication accept message; and the direct communication reject message; wherein the second information is used to indicate support information or preferential information of the second terminal for the communication.

15. The terminal according to claim 13, wherein the first information is further used to indicate at least one of service information of the SL communication or address information of the SL communication;

or the first information is further used to indicate at least one of service information of the WLAN communication or address information of the WLAN communication;

or the first information is further used to indicate at least one of service information of the aggregated communication of SL and WLAN or address information of the aggregated communication of SL and WLAN.

16. The terminal according to claim 15, wherein the address information of the WLAN communication comprises at least one of WLAN port configuration, WLAN identification information, a WLAN version, or a WLAN protocol; and the WLAN identification information comprises a basic service set identifier, a homogeneous extended service set identifier, and a service set identifier.

17. A terminal, the terminal being a first terminal, the first terminal comprising a processor, a memory, and a program or instruction that is stored in the memory and executable on the processor, wherein the program or the instruction, when executed by the processor, causes the first terminal to perform:

sending first information to a second terminal; wherein the first information is used to indicate support information or preferential information of the first terminal for communication, and the communication comprises first communication and second communication, wherein in response to the first communication being sidelink (SL) communication and the second communication being wireless local area network (WLAN) communication, the support information is used to indicate one of the following:

that only the SL communication is supported;

that only the WLAN communication is supported; and that aggregated communication of SL and WLAN is supported; or the preferential information is used to indicate that aggregated communication of SL and WLAN is preferential.

18. The terminal according to claim 17, wherein the program or the instruction, when executed by the processor, causes the first terminal to further perform:

receiving a discovery response message sent by the second terminal;

or receiving a direct communication accept message or a direct communication reject message sent by the second terminal;

wherein second information is carried in any one of the following:

the discovery response message;

the direct communication accept message; and the direct communication reject message; wherein the second information is used to indicate support information or preferential information of the second terminal for the communication.

19. The terminal according to claim 17, wherein the first information is further used to indicate at least one of service information of the SL communication or address information of the SL communication;

or the first information is further used to indicate at least one of service information of the WLAN communication or address information of the WLAN communication;

or the first information is further used to indicate at least one of service information of the aggregated communication of SL and WLAN or address information of the aggregated communication of SL and WLAN.

20. The terminal according to claim 17, wherein the first information is carried in a discovery message or a direct communication request message; or the first information satisfies any one of the following:

that the first information is preconfigured on the first terminal; and that the first information is configured by a network device.

* * * * *